Patented Nov. 17, 1953

2,659,725

UNITED STATES PATENT OFFICE 2,659,725

QUATERNARY AMMONIUM SALTS OF HETEROCYCLYLALKANOL ESTERS OF XANTHENE-9-CARBOXYLIC ACID

John W. Cusic, Skokie, and Richard A. Robinson, Morton Grove, Ill., assignors to G. D. Searle & Co., Chicago, Ill., a corporation of Illinois No Drawing. Application June 21, 1950, Serial No. 169,535

26 Claims. (Cl. 260—247.2)

1

The present invention relates to a new group of quaternary ammonium salts of basic esters of polynuclear carboxylic acids and to the preparation thereof. In particular this invention relates to quaternary ammonium salts of xanthene-9-carboxylates of N-(hydroxyalkyl) derivatives of nitrogen-containing heterocycles. The compounds which constitute our invention may be represented by the following general structural formula

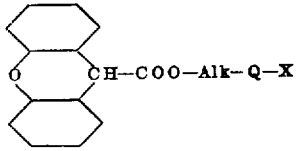

wherein Alk is a lower alkylene radical, Q is a quaternary nitrogen atom being part of a heterocycle and bearing a monovalent aliphatic-type radical, and X is one equivalent of an anion. The corresponding 9-alkyl derivatives, in which the hydrogen on carbon-9 in the xanthene nucleus is replaced by an aliphatic-type radical, will be the subject of a separate application.

In the foregoing structural formula Alk represents a bivalent aliphatic radical derived from an aliphatic hydrocarbon which may be straight- or branch-chained and which contains from 2 to 6 carbon atoms, such as ethylene, propylene, butylene, amylene, hexylene, as well as polymethylenes from trimethylene to hexamethylene. Q is a quaternary ammonium radical of the type shown

wherein Z represents those elements which with N form a monocyclic heterocyclic radical. It is a nitrogen atom which is part of a heterocyclic amino radical and includes such cyclic radicals as pyrrolidino, piperidino, morpholino, thiamorpholino, piperazino, quinolino, isoquinolino, tetrahydroquinolino and tetrahydroisoquinolino and alkylated derivatives of such cyclic amino radicals, as lupetidino, N'-methylpiperazino and the like. R represents an aliphatic-type radical of the class consisting of lower alkyl and arylalkyl radicals such as methyl, ethyl, propyl, butyl, amyl and hexyl, benzyl, phenethyl, phenylpropyl and the like. R may also represent a carboxyalkyl group of the type

—alkylene—COOH and esters thereof. X represents an equivalent of an anion such as chloride, bromide, methyl sulfate, ethyl sulfate, benzenesulfonate, toluenesulfonate, tartrate, ascorbate, succinate, malate, acetate, citrate, nitrate, sulfate, phosphate and the like.

The compounds of our invention are prepared from the corresponding tertiary amino esters of the type

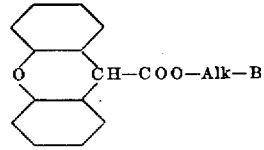

wherein Alk is an alkylene group and B is a nitrogen-containing heterocycle attached through the nitrogen to the Alk group. The hydrochlorides of such tertiary amino esters may be prepared by heating free xanthene-9-carboxylic acid with an N-heterocyclylalkyl halide of the type

Halogen-Alk-B wherein Alk and B are defined as before, suitably in a water miscible organic solvent such as isopropanol or acetone. Alternatively, esterification may be effected by treatment of the xanthene-9-carbonyl chloride with an N-heterocyclylalkanol. The resulting tertiary amino esters are then reacted with an aliphatic or aralphatic ester of a strong organic or inorganic acid of the formula

R—X wherein R and X are defined as before. These reactions are preferably carried out at elevated temperatures in the range of 50–150° C. in inert solvents such as acetone, butanone, lower alcohols, chloroform and nitromethane. However, lower temperatures are also satisfactory. These reactions are preferably carried out in a closed system if a lower alkyl halide is used as one of the reagents. In most instances, the crystalline quaternary salt precipitates from the chilled reaction mixture and may be isolated by filtration and drying. In certain instances precipitation is induced by the addition of a solvent, such as a low boiling ether or hydrocarbon, in order to lower the solubility of the salt in the selected solvent.

An alternative methd of preparing the quaternary ammonium compounds consists in heating a haloalkyl ester of xanthene-9-carboxylic acid with the nitrogen-containing heterocycle bearing an aliphatic-type radical on the nitrogen in an inert solvent such as a lower ketone or alcohol, and isolating as before. This reaction may be represented schematically as follows, wherein Alk, R and Z have the meanings given hereinabove and X is a halogen radical

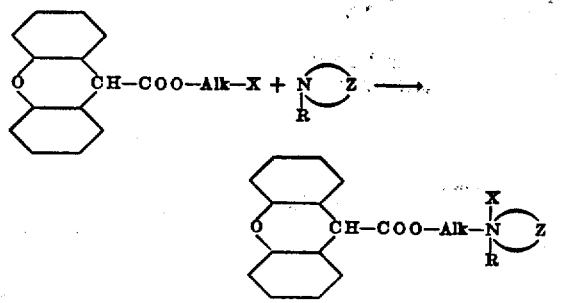

It is the purpose of this invention to provide novel chemical compounds and methods for their production.

The compounds of this invention exhibit surface activity and certain of them are useful as parasiticidal and dispersing agents. They are of special value as medicinal agents, certain of them having potent sympatholytic and parasympatholytic properties. They have a high degree of activity in blocking the transmission of nerve impulses through myoneural junctions and are potent ganglion blocking agents.

The following examples explain in detail certain of the compounds which represent this invention and methods for producing them. The invention is not to be construed as limited in spirit or in scope thereby. It will be apparent to those skilled in the art that many modifications in materials and methods may be made without departing from the invention. In these examples the temperatures are given in degrees centigrade (°C.), the quantities of material in parts by weight and pressures during vacuum distillation in millimeters (mm.) of mercury.

EXAMPLE 1

*Xanthene-9-carboxylic acid ester of N-(β-hydroxyethyl)-pyrrolidine*

7 parts of metallic sodium are dissolved in 470 parts of anhydrous isopropanol with stirring and heated to refluxing temperature. Addition of 60 parts of xanthene-9-carboxylic acid causes the solution to become pasty and difficult to stir, but addition of 42 parts of the hydrochloride of N-(β-chloroethyl)pyrrolidine restores fluidity. The mixture is stirred and heated at refluxing temperature for 3 hours. Most of the solvent is then distilled off. After cooling ether and dilute sodium hydroxide are added, the ether solution is separated and dried, and evaporation of the solvents yields the xanthene-9-carboxylic acid ester of N-(β-hydroxyethyl)-pyrrolidine as an oil. The ether solution of this base is treated with an isopropanol solution of hydrogen chloride. The hydrochloride crystallizes after standing for 12 hours. Recrystallization from butanone using charcoal as a clarifying agent yields colorless crystals which melt at about 128 to 129° C.

EXAMPLE 2

*Xanthene-9-carboxylic acid ester of N-(β-hydroxyethyl)-N-methylpyrrolidinium bromide*

10 parts of the xanthene-9-carboxylic acid ester of N-(β-hydroxyethyl)pyrrolidine are treated with 10 parts of methyl bromide in 320 parts of butanone in a closed vessel at room temperature. Towards the end of the reaction an oily product forms which crystallizes upon chilling. Recrystallization from isopropanol with the use of charcoal as a clarifying agent yields the xanthene-9-carboxylic acid ester of N-(β-hydroxyethyl)-N-methylpyrrolidinium bromide melting at about 164–166° C. It has the structural formula

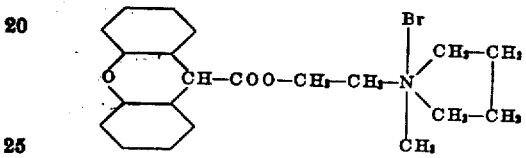

The same compound can be prepared by heating 100 parts of the β-bromoethyl ester of xanthene-9-carboxylic acid with 17 parts of N-methylpyrrolidine in butanone for 4 hours and isolating the product as hereinabove.

EXAMPLE 3

*Xanthene-9-carboxylic acid ester of N-(β-hydroxyethyl)-N-ethylpyrrolidinium bromide*

17 parts of xanthene-9-carboxylic acid ester of N-(β-hydroxyethyl)pyrrolidine are heated with 35.5 parts of ethyl bromide in 80 parts of butanone in a shielded pressure reactor for 6 days at 80° C. A solid precipitate forms. The xanthene-9-carboxlic ester of N-(β-hydroxyethyl)-N-ethylpyrrolidinium bromide is recrystallized from isopropanol using charcoal as a clarifying agent. It melts at about 179–180° C. This bromide is converted to the corresponding acid tartrate by the reaction with ½ molecular equivalent of silver tartrate and ½ molecular equivalent of tartaric acid in cold absolute methanol. The silver bromide is filtered off and the filtrate is evaporated under vacuum. The resulting salt is washed with ether and butanone and dried.

EXAMPLE 4

*Xanthene-9-carboxylic acid ester of N-(β-hydroxyethyl)-2,5-dimethylpyrrolidine*

A mixture of 40 parts of xanthene-9-carboxylic acid, 29 parts of N-(β-chloroethyl)-2,5-dimethylpyrrolidine and 80 parts of isopropanol is heated at refluxing temperature for five hours and then filtered through charcoal. Ether is added to the filtrate to incipient turbidity (about 285 parts) and the xanthene-9-carboxylic acid ester of N-(β-hydroxyethyl)-2,5-dimethylpyrrolidine hydrochloride crystallizes after a short time. The white crystals melt at about 144–145° C.

EXAMPLE 5

*Xanthene-9-carboxylic acid ester of N-(β-hydroxyethyl)-N-methyl-2,5-dimethylpyrrolidinium bromide*

40 parts of the xanthene-9-carboxylic acid ester of N-(β-hydroxyethyl)-2,5-dimethylpyrrolidine hydrochloride, dissolved in a minimum amount of water, are made alkaline with an excess of concentrated sodium carbonate solution and the resulting base is extracted with ether, dried thoroughly over anhydrous potassium carbonate and evaporated. The base is dissolved in 150 parts of anhydrous chloroform, saturated with 10 parts of methyl bromide and stored at 70±5° C. in a pressure vessel for 45 hours. The xanthene-9-carboxylic acid ester of N-(β-hydroxyethyl) - N-methyl-2,5 - dimethylpyrrolidinium bromide is precipitated by addition with ether. After filtration and washing with ether, the white crystals melt at about 180° C. They may be further purified by grinding with butanone. The compound has the structural formula

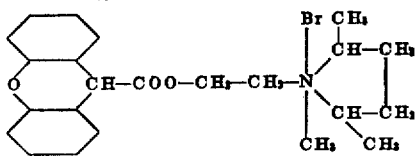

EXAMPLE 6

*Xanthene-9-carboxylic acid ester of N-(β-hydroxyethyl)-piperidine*

To a solution of 69 parts of metallic sodium in 5500 parts of isopropanol 492 parts of the hydrochloride of N-(β-chloroethyl)piperidine and 678 parts of xanthene-9-carboxylic acid are added. After stirring at refluxing temperature for 3 hours, most of the solvent is distilled off. The residue is cooled and treated with ether and dilute sodium hydroxide. The ether layer is separated and dried over anhydrous potassium carbonate. Distillation of the solvents leaves the xanthene-9-carboxylic acid ester of N-(β-hydroxyethyl)piperidine as an oil.

EXAMPLE 7

*Xanthene-9-carboxylic acid ester of N-(β-hydroxyethyl)-N-methylpiperidinium bromide*

15 parts of the xanthene-9-carboxylic acid ester of N-(β-hydroxyethyl)piperidine are treated with 15 parts of methyl bromide in 60 parts of butanone at room temperature. An oily precipitate forms within a few minutes and begins to crystallize after a short time. Recrystallization from isopropanol yields the xanthene-9-carboxylic acid ester of N-(β-hydroxyethyl)-N-methylpiperidinium bromide which melts at about 161-162° C. This bromide is converted to the malate by treatment with ½ mole of silver malate and ½ mole of malic acid at room temperature. The silver bromide is filtered off and the solution of the malate salt is evaporated under vacuum.

EXAMPLE 8

*Xanthene-9-carboxylic acid ester of N-(β-hydroxyethyl)-N-ethylpiperidinum bromide*

15 parts of the xanthene-9-carboxylic acid ester of N-(β-hydroxyethyl)piperidine are heated with 27 parts of ethyl bromide in 60 parts of butanone in a sielded pressure bottle at 80° C. for 4 days. After cooling the solid precipitate is collected on a filter and recrystallized from isopropanol using charcoal as a clarifying agent. The xanthene-9-carboxylic acid ester of N-(β-hydroxyethyl)-N-ethylpiperidinium bromide melts at about 167-168° C. The corresponding chloride can also be prepared by an alternative procedure, in which 40 parts of the β-chloroethyl ester of xanthene-9-carboxylic acid is heated at refluxing temperature for 4 hours with 11 parts of N-ethylpiperidine, the isolation of the pure product being carried out as above.

EXAMPLE 9

*Bromide of the ethyl N-(β-hydroxyethyl)-N-piperidinum-acetate ester of xanthene-9-carboxylic acid*

15 parts of the xanthene-9-carboxylic acid ester of N-(β-hydroxyethyl)piperidine are heated at refluxing temperature with a solution of 23 parts of the ethyl ester of bromoacetic acid in 60 parts of butanone for 5-10 minutes. The solid mixture is recrystallized from isopropanol. The bromide of the ethyl N-(β-hydroxyethyl)-N-piperidiniumacetate ester of xanthene-9-carboxylic acid melts at about 180-181° C. It has the structural formula

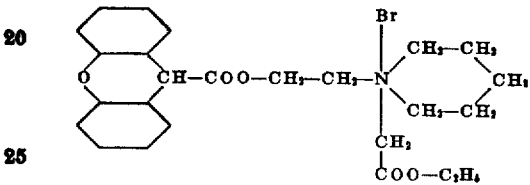

EXAMPLE 10

*Xanthene-9-carboxylic acid ester of N-(β-hydroxyethyl)-morpholine*

113 parts of xanthene-9-carboxylic acid are heated at refluxing temperature for 3 hours with a solution of 75 parts of thionyl chloride in 450 parts of dry toluene. About one half of the volume of the clear straw-colored solution is distilled off, the excess thionyl chloride being removed. The residue is cooled and filtered with charcoal. The filtrate is mixed under cooling with a solution of 32 parts of morpholinoethanol in 450 parts of dry toluene. The mixture is refluxed for 3 hours and permitted to stand for a day. After decantation the solid precipitate is heated with water, the resulting partial solution is filtered and the filtrate washed with ether. The aqueous layer is made alkaline and extracted with ether. Upon distillation of the solvent the xanthene-9-carboxylic acid ester of N-(β-hydroxyethyl)morpholine is obtained as an oil which solidifies upon standing. To a solution of the base in ether a 25% hydrogen chloride solution in anhydrous isopropanol is added to form the hydrochloride which recrystallizes from dilute isopropanol and melts at about 182-183° C.

EXAMPLE 11

*Xanthene-9-carboxylic acid ester of N-(β-hydroxyethyl)-N-methylmorpholinium bromide*

15 parts of the xanthene-9-carboxylic acid ester of N - (β - hydroxyethyl)morpholine are heated with a solution of 15 parts of methyl bromide in 400 parts of butanone in a shielded pressure vessel at 80° C. for 2 hours. The mixture is kept at 0° C. for 12 hours and the xanthene-9-carboxylic acid ester of N-(β-hydroxyethyl)-N-methylmorpholinium bromide is crystallized twice from isopropanol. It melts at about 168-169° C. and has the structural formula

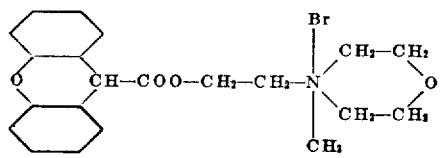

EXAMPLE 12

*Xanthene-9-carboxylic acid ester of N-(β-hydroxypropyl)-N-benzylmorpholinium chloride*

35 parts of xanthene-9-carboxylic acid ester of N-(β-hydroxypropyl) morpholine, prepared by the method of Example 15, are heated with a solution of 19 parts of benzyl chloride in 700 parts of butanone in a shielded pressure bottle at 80° C. for 4 hours. The mixture is kept at 0° C. for 12 hours and the xanthene-9-carboxylic acid ester of N-(β-hydroxypropyl)-N-benzylmorpholinium chloride is recrystallized from isopropanol. In order to convert the chloride into the citrate, an absolute isopropanol solution of 3 moles of the bromide is stirred with 1 mole of silver citrate and 2 moles of anhydrous citric acid at room temperature for an hour. The silver chloride is filtered off and the filtrate is concentrated under vacuum at room temperature. The oily residue of the dihydrogen citrate may be purified by washing with ether and crystallized from dioxane. The cation has the structural formula

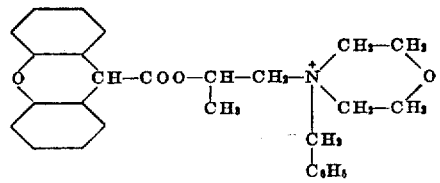

EXAMPLE 13

*Xanthene-9-carboxylic acid ester of N-(β-hydroxyethyl)-lupetidine*

A mixture of 60 parts of xanthene-9-carboxylic acid and 47 parts of N-(β-chloroethyl)-lupetidine in 80 parts of anhydrous isopropanol is heated at refluxing temperature for 5 hours and then filtered over charcoal. The filtrate is treated with ether to the point of turbidity. Since the hydrochloride cannot readily be induced to crystallize, it is converted to the free base by the method indicated in Example 1.

EXAMPLE 14

*Xanthene-9-carboxylic acid ester of N-(β-hydroxyethyl)-N-methyl-lupetidinium bromide*

50 parts of the xanthene-9-carboxylic acid ester of N-(β-hydroxyethyl)lupetidine are treated with 19 parts of methyl bromide in 140 parts of anhydrous chloroform in a pressure bottle. After heating at 70 ± 5° C. for 85 hours and then at 95 ± 5° C. for 2 hours the product is precipitated with ether. The xanthene-9-carboxylic acid ester of N-(β-hydroxyethyl)-N-methyllupetidinium bromide crystallizes within 10 to 20 minutes. It is collected on a filter, washed with ether and recrystallized from isopropanol. The resulting crystals are further purified by washing with isopropanol, butanone and anhydrous ether. The small white crystals melt at about 215° C. The compound has the structural formula

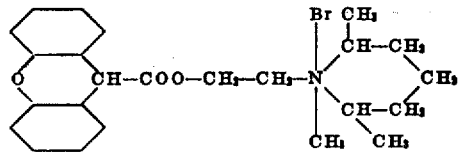

EXAMPLE 15

*Xanthene-9-carboxylic acid ester of N-(β-hydroxypropyl) morpholine*

A solution of 45 parts of xanthene-9-carboxylic acid and 30 parts of thionyl chloride in 200 parts of dry toluene is refluxed for 3 hours and then evaporated under vacuum to about one-half its volume. The residue is treated with activated charcoal, filtered and mixed with good agitation and cooling to a solution of 14 parts of N-(β-hydroxypropyl)morpholine in 200 parts of dry toluene. The mixture is refluxed for 3 hours, then chilled and decanted from the solid precipitate. The precipitate is heated with water and the partial solution is filtered, cooled and washed with ether. The aqueous phase is made alkaline and extracted with ether. The extract is dried and evaporated and the residue of the xanthene-9-carboxylic acid ester of N-(β-hydroxypropyl) morpholine is obtained as a viscous oil.

We claim:

1. A quaternary ammonium salt of a xanthene-9-carboxylate of the structural formula

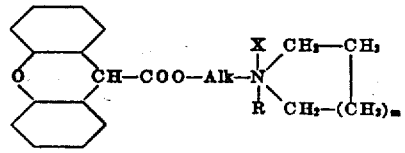

wherein Alk is a lower alkylene radical, R is a lower alkyl radical, X is one equivalent of an anion and *m* is an integer from one to two, inclusive.

2. A quaternary ammonium salt of a xanthene-9-carboxylic acid ester of an N-(hydroxyalkyl)piperidine which can be represented by the structural formula

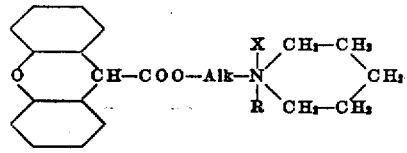

wherein Alk is a lower alkylene radical, R is a lower alkyl radical and X is one equivalent of an anion.

3. A quaternary ammonium salt of the xanthene-9-carboxylic acid ester of N-(β-hydroxyethyl)piperidine which can be represented by the structural formula

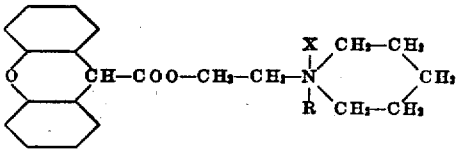

wherein R is a lower alkyl radical and X is one equivalent of an anion.

4. A quaternary ammonium salt of a xanthene-9-carboxylic acid ester of an N-(hydroxyalkyl)pyrrolidine which can be represented by the structural formula

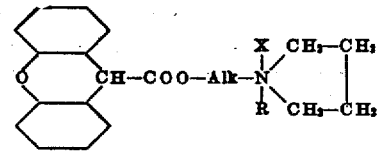

wherein Alk is a lower alkylene radical, R is a lower alkyl radical and X is one equivalent of an anion.

5. A quaternary ammonium salt of the xanthene-9-carboxylic acid ester of N-(β-hydroxyethyl)pyrrolidine which can be represented by the structural formula

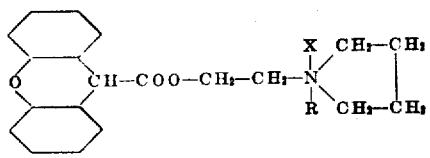

wherein R is a lower alkyl radical and X is one equivalent of an anion.

6. A quaternary ammonium salt of a xanthene-9-carboxylate of the structural formula

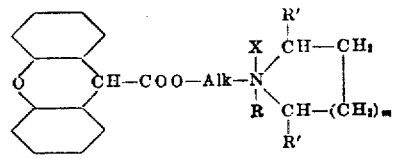

wherein Alk is a lower alkylene radical, R and R' are lower alkyl radicals, X is one equivalent of an anion and $m$ is an integer from one to two, inclusive.

7. A quaternary ammonium salt of a xanthene-9-carboxylate of the structural formula

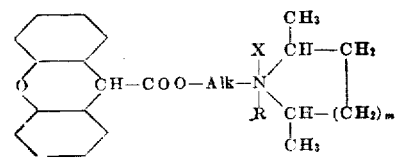

wherein Alk is a lower alkyl radical, X is one equivalent of an anion and $m$ is an integer from one to two, inclusive.

8. A quaternary ammonium salt of a xanthene-9-carboxylic acid ester of an N-(hydroxyalkyl)lupetidine which is represented by the structural formula

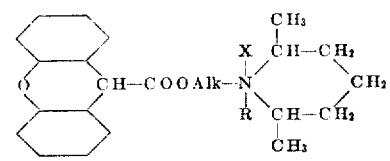

wherein Alk is a lower alkylene radical, R is a lower alkyl radical and X is one equivalent of an anion.

9. A quaternary ammonium salt of a xanthene-9-carboxylic acid ester of N-(β-hydroxyethyl)lupetidine which is represented by the structural formula

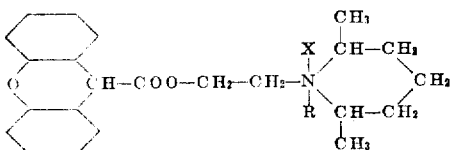

wherein R is a lower alkyl radical and X is one equivalent of an anion.

10. A quaternary ammonium salt of a xanthene-9-carboxylic acid ester of an N-(hydroxyalkyl)-2,5-dimethyl-pyrrolidine which is represented by the structural formula

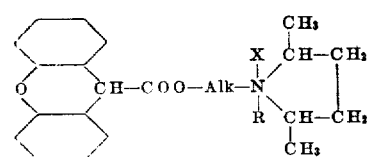

wherein Alk is a lower alkylene radical, R is a lower alkyl radical and X is one equivalent of an anion.

11. A quaternary ammonium salt of a xanthene-9-carboxylic acid ester of N-(β-hydroxyethyl)-2,5-dimethyl-pyrrolidine which is represented by the structural formula

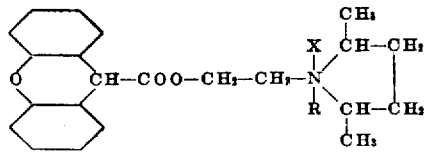

wherein R is a lower alkyl radical and X is one equivalent of an anion.

12. A quaternary ammonium salt of a xanthene-9-carboxylic acid ester of an N-(hydroxyalkyl)morpholine which is represented by the structural formula

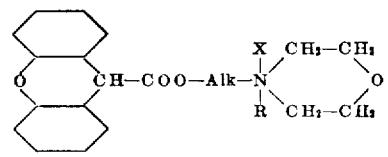

wherein Alk is a lower alkylene radical, R is a lower alkyl radical and X is one equivalent of an anion.

13. A quaternary ammonium salt of a xanthene-9-carboxylic acid ester of N-(β-hydroxyethyl)morpholine which is represented by the structural formula

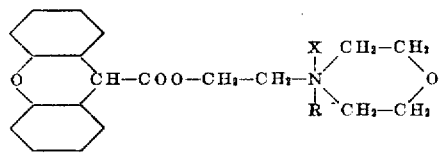

wherein R is a lower alkyl radical and X is one equivalent of an anion.

14. A quaternary ammonium salt of a xanthene-9-carboxylate of the structural formula

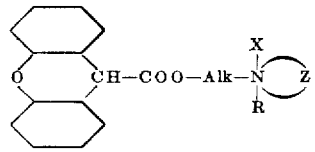

wherein Alk is a lower alkylene radical; NZ is a member of the class consisting of the morpholino radical, the pyrrolidino radical, a pyrrolidino radical containing a lower alkyl radical attached to a carbon atom adjacent to the nitrogen atom, the piperidino radical, and a piperidino radical containing a lower alkyl radical attached to a carbon atom adjacent to the nitrogen atom; R is a member of the class consisting of lower-alkyl, lower-aralkyl, —CH₂COOH, and —CH₂COO-(lower alkyl) radicals; and X is one equivalent of an anion.

15. A quaternary ammonium halide of the xanthene-9-carboxylic acid ester of N-(β-hydroxyethyl)piperidine having the structural formula

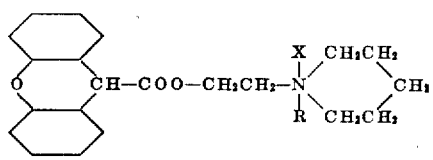

wherein X is halogen and R is a lower alkyl radical.

16. A quaternary ammonium halide as defined in claim 15 wherein X is bromine and R is ethyl.

17. A quaternary ammonium halide of the xanthene-9-carboxylic acid ester of N-(β-hydroxyethyl)pyrrolidine having the structural formula

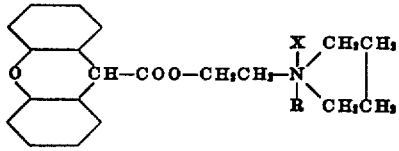

wherein X is halogen and R is a lower alkyl radical.

18. A quaternary ammonium halide as defined in claim 17 wherein X is bromine and R is ethyl.

19. A quaternary ammonium halide of the xanthene-9-carboxylic acid ester of N-(β-hydroxyethyl)lupetidine having the structural formula

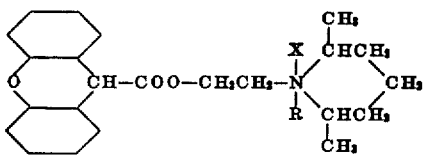

wherein X is halogen and R is a lower alkyl radical.

20. A quaternary ammonium halide as defined in claim 19 wherein X is bromine and R is methyl.

21. A quaternary ammonium halide of the xanthene-9-carboxylic acid ester of N-(β-hydroxyethyl)-2,5-dimethylpyrrolidine having the structural formula

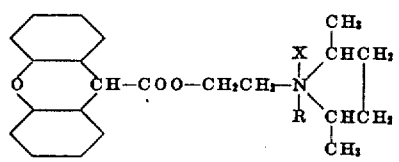

wherein X is halogen and R is a lower alkyl radical.

22. A quaternary ammonium halide as defined in claim 21 wherein X is bromine and R is methyl.

23. A quaternary ammonium halide of the xanthene-9-carboxylic acid ester of N-(β-hydroxyethyl)morpholine having the structural formula

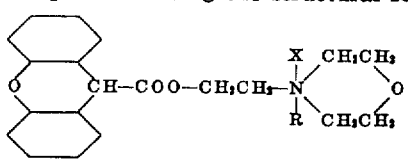

wherein X is halogen and R is a lower alkyl radical.

24. A quaternary ammonium halide as defined in claim 23 wherein X is bromine and R is methyl.

25. The process of producing a quaternary ammonium halide of a xanthene-9-carboxylate of the structural formula

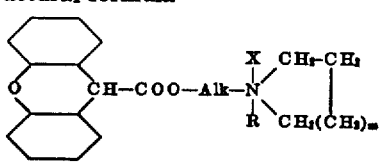

wherein Alk is a lower alkylene radical, X is halogen, R is a lower alkyl radical and $m$ is an integer from one to two, inclusive, which comprises reacting an ester of the formula

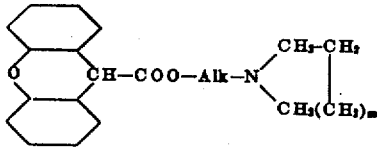

wherein all symbols have the meanings given above, with a lower alkyl halide in an inert solvent and separating the quaternary ammonium salt thus formed.

26. The process of producing a quaternary ammonium halide of a xanthene-9-carboxylate of the structural formula

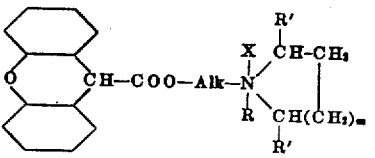

wherein Alk is a lower alkylene radical, R and R' are lower alkyl radicals, X is halogen and $m$ is an integer from one to two, inclusive, which comprises reacting an ester of the formula

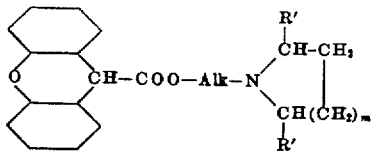

wherein all symbols have the meanings given above, with a lower alkyl halide in an inert solvent and separating the quaternary ammonium salt thus formed.

JOHN W. CUSIC.
RICHARD A. ROBINSON.

References Cited in the file of this patent

UNITED STATES PATENTS

| Number | Name | Date |
|---|---|---|
| 2,079,962 | Miescher et al. | May 11, 1937 |
| 2,265,185 | Miescher et al. | Dec. 9, 1941 |
| 2,387,447 | Hoffmann et al. | Oct. 23, 1945 |
| 2,428,239 | Parker et al. | Sept. 30, 1947 |
| 2,430,116 | Holmes et al. | Nov. 4, 1947 |
| 2,480,224 | Cusic et al. | Aug. 30, 1949 |
| 2,485,550 | Aeschlimum et al. | Oct. 25, 1949 |
| 2,510,773 | Clinton | June 6, 1950 |

FOREIGN PATENTS

| Number | Country | Date |
|---|---|---|
| 532,943 | Great Britain | Feb. 4, 1941 |

OTHER REFERENCES

Burtner et al.: Journal Amer. Chem. Soc., vol. 65 (1943), pp. 1581–5, secondary art.

Certificate of Correction

Patent No. 2,659,725 — November 17, 1953

John W. Cusic et al.

It is hereby certified that error appears in the printed specification of the above numbered patent requiring correction as follows:

Column 3, line 6, for "methd" read *method*; column 4, line 40, for "carboxlic" read *carboxylic*; column 5, line 65, for "sielded" read *shielded*; column 7, line 5, after "of", first occurrence, insert *the*; column 10, line 51, for "NZ" read $$N\frown Z$$

and that the said Letters Patent should be read as corrected above, so that the same may conform to the record of the case in the Patent Office.

Signed and sealed this 2nd day of February, A. D. 1954.

[SEAL]

ARTHUR W. CROCKER,
*Assistant Commissioner of Patents.*

Certificate of Correction

Patent No. 2,659,725                    November 17, 1953

John W. Cusic et al.

It is hereby certified that error appears in the printed specification of the above numbered patent requiring correction as follows:

Column 3, line 6, for "methd" read *method*; column 4, line 40, for "carboxlic" read *carboxylic*; column 5, line 65, for "sielded" read *shielded*; column 7, line 5, after "of", first occurrence, insert *the*; column 10, line 51, for "NZ" read $$N\bigcirc Z$$

and that the said Letters Patent should be read as corrected above, so that the same may conform to the record of the case in the Patent Office.

Signed and sealed this 2nd day of February, A. D. 1954.

[SEAL]

ARTHUR W. CROCKER,
*Assistant Commissioner of Patents.*